$$G'_z = \int_{r_1}^{r_2} \frac{r_2}{g} \, dr$$

INVENTORS
Henri Georges Doll
Jean L. Dumanoir

United States Patent Office 3,466,533
Patented Sept. 9, 1969

3,466,533
INDUCTION LOGGING APPARATUS WITH REDUCED DIAMETER AUXILIARY COIL MEANS
Henri Georges Doll and Jean L. Dumanoir, New York, N.Y., assignors to Schlumberger Technology Corporation, New York, N.Y., a corporation of Texas
Filed May 1, 1967, Ser. No. 635,140
Int. Cl. G01v 3/12
U.S. Cl. 324—6     7 Claims

ABSTRACT OF THE DISCLOSURE

Electromagnetic induction type apparatus for investigating subsurface earth formations traversed by a borehole. An induction logging coil system is described which is less sensitive to the presence of short caved-in intervals along the length of the borehole over which the investigation is being conducted. This result is obtained by employing, in addition to the primary coils, various reduced diameter auxiliary coils, each having an effective number of turns of less than unity.

---

This invention relates to induction logging apparatus for investigating subsurface earth formations traversed by a borehole.

Induction logging apparatus is used to measure the electrical resistivity or electrical conductivity of the different subsurface earth strata adjacent an oil well type of borehole drilled into the earth. The resulting record or log of the measurements is useful for identifying and evaluating the different types of fluids, for example, oil, gas or water, that may be contained in the various subsurface formations.

A problem that sometimes occurs with some forms of induction logging apparatus is that such apparatus is relatively sensitive to and is adversely affected by the presence of short caved-in intervals along the length of the borehole over which the investigation is being conducted. The reason for this is that the caved-in interval is of appreciably larger diameter than the diameter of the borehole immediately above and below such interval. As a consequence, the drilling fluid occupying this increased diameter region, if of a different conductivity value than the adjoinng earth formation, adds an extraneous component to the coil system measurement signal. This component is undesirable because it varies with the diameter and extent of the caved-in interval and because it occurs in a more or less random manner.

In the designing of induction logging coil systems it has been found that a coil having a fractional number of turns is sometimes called for at some location in the system in order to provide a desired response pattern for the system. A coil having a fractional number of turns is almost impossible to construct from a practical standpoint. Once a coil begins to have less than one complete turn, it begins to cease to be a coil. In such cases, the need for such a fractional turn coil would probably be ignored and the coil simply omitted from the design. If the results were unsatisfactory, then the coil system design as a whole would probably be modified in some way to eliminate the need for such a coil.

It is an object of the invention, therefore, to provide new and improved induction logging apparatus which is less sensitive to the presence of short caved-in intervals along the borehole.

It is another object of the invention to provide new and improved induction logging apparatus having coils which, from an electrical standpoint, have an effective number of turns of less than unity, while from a mechanical standpoint they actually have a whole number of complete turns.

In accordance with the present invention, there is provided induction logging apparatus comprising a coil system adapted for movement through a borehole filled with a fluid material and including at least a first coil and a second coil longitudinally spaced from one another. The apparatus also includes circuit means for causing one of the first and second coils to function as a transmitter coil for inducing current flow in the surrounding subsurface material. The apparatus further includes circuit means for causing the other of the first and second coils to function as a receiver coil for developing a signal dependent on the magnitude of the induced current flow in a portion of the surrounding subsurface material. The apparatus additionally includes at least one auxiliary coil supported adjacent the first coil and having an effective number of turns of less than unity relative to the transmitter an receiver coils for producing a response from the subsurface material including the fluid material in a limited region near the first coil which is of opposite polarity to and which at least in part offsets the response normally obtained from this region. The induction logging apparatus further includes circuit means for causing the auxiliary coil to function as the same type of coil (i.e., transmitter or receiver) as the second coil Since the auxiliary coil has an effective number of turns of less than unity, it can be said to constitute a "fractional turn" coil.

For a better understanding of the present invention, together with other and further objects thereof, reference is had to the following description taken in connection with the accompanying drawings, the scope of the invention being pointed out in the appended claims.

Referring to the drawings:

FIG. 3 is an explanatory sketch used to explain the meaning of the geometrical factor response shown in FIG. 2.

Figure 1:
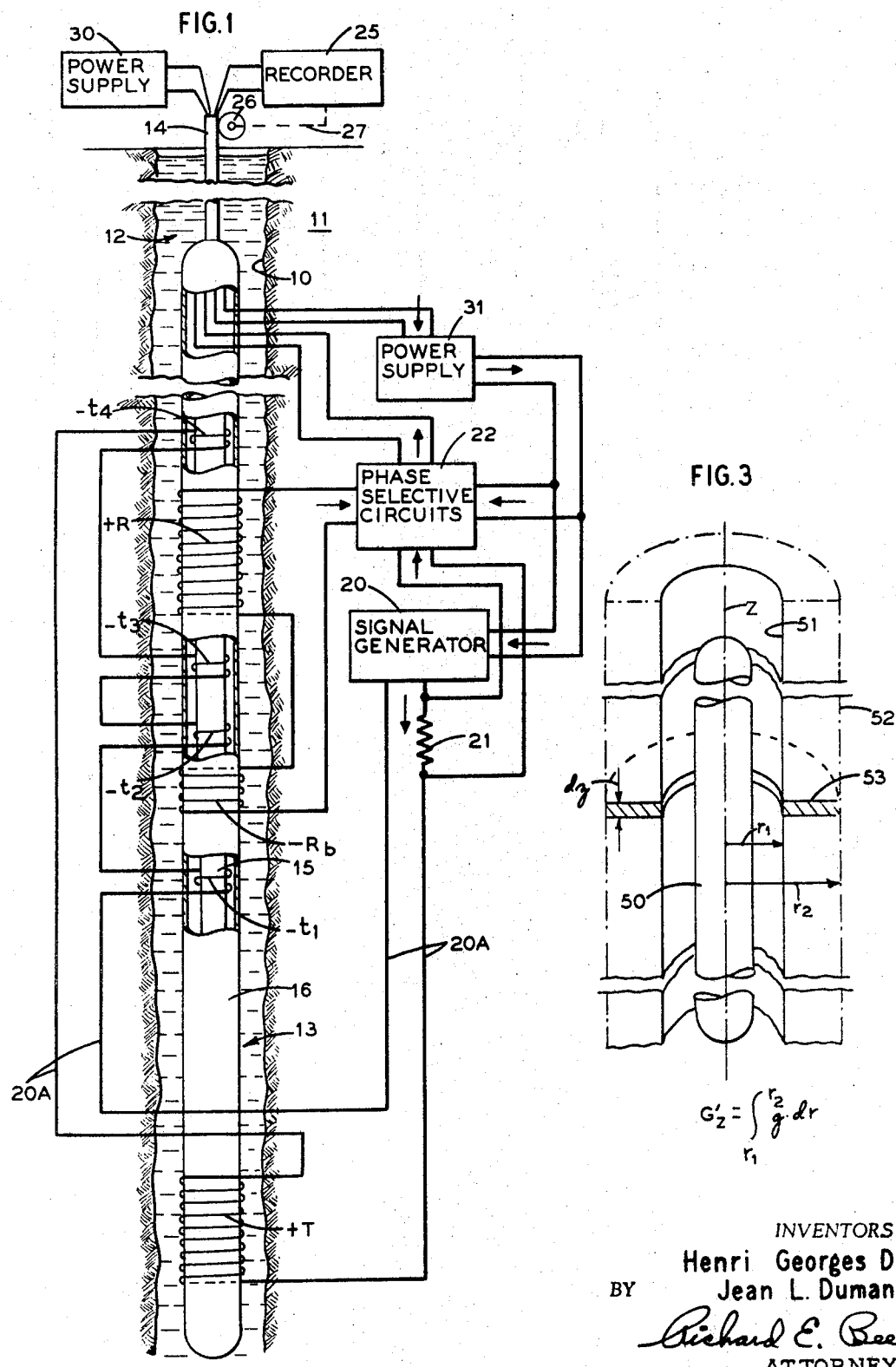
FIG. 1 is a cross-sectional view of an earth borehole showing in a schematic manner a representative embodiment of the present invention.

Referring to FIGURE 1 of the drawings, there is shown, in a cross-sectional manner, a borehole 10 passing downwardly through subsurface earth formations 11. The borehole 10 is filled with a drilling fluid or drilling mud 12. Shown suspended in the borehole 10 is an induction logging apparatus 13. This apparatus 13 is suspended by means of an armored multi-conductor cable 14 which extends to the surface of the earth and is connected to a suitable drum and winch mechanism (not shown) for raising and lowering the apparatus 13. The electrical circuits shown to the right of the borehole 10 are actually located inside of the upper portion of the housing of the apparatus 13.

The induction logging apparatus 13 includes an elongated cylindrical inner support member 15 surrounded by an elongated cylindrical outer support member 16, such outer member 16 being in the form of a hollow cylindrical sleeve member the inside diameter of which is sufficient to accommodate the inner support member 15. Each of these support members 15 and 16 is constructed of non-magnetic, non-conductive material such as a plastic material. Mounted on the outer support member 16 is a transmitter coil T and a pair of receiver coils R and $R_b$. Each of these primary coils T, R and $R_b$ is a cylindrical solenoid type coil having several turns of insulated conductor wire wound around the outer support member 16, each coil being coaxial with the longitudinal center axis of the support member 16.

The induction logging apparatus 13 also includes a first pair of auxiliary coils, $t_1$ and $t_2$, which are supported on the inner support member 15, one immediately below and the other immediately above the first receiver coil $R_b$. A second pair of auxiliary coils, $t_3$ and $t_4$, are supported on the inner support member 15, one immediately below and the other immediately above the second receiver coil R. Each of the auxiliary coils $t_1$, $t_2$, $t_3$ and $t_4$ is comprised of one or more turns of insulated conductor wire which is wound around the inner support member 15. Since the outside diameter of the inner support member 15 is substantially less than the outside diameter of the outer support member 16, each of the auxiliary coils $t_1$, $t_2$, $t_3$ and $t_4$ has a diameter which is substantially less than the diameter of the primary coils T, R and $R_b$. As a consequence, each of the auxiliary coils $t_1$, $t_2$, $t_3$ and $t_4$ has an effective number of turns of less than unity as compared to a coil having the same actual number of turns, but having the same diameter as the primary coils mounted on the outer support member 16.

The induction logging apparatus 13 further includes circuit means for energizing the transmitter coil T for including current flow in the surrounding subsurface material. This circuit means includes a signal generator 20 connected by suitable insulated conductor wires 20a to the transmitter coil T. A resistor 21 having a very small resistance value is connected in series with one of these conductor wires. The signal generator 20 produces a continuous sinusoidal output signal having a frequency of, for example, 20 kilohertz.

The induction logging apparatus 13 also includes circuit means for causing the auxiliary coils to function as additional transmitter coils. This circuit means includes the insulated conductor wires 20a which interconnect the auxiliary coils $t_1$, $t_2$, $t_3$ and $t_4$ in series with the transmitter coil T. As a consequence, the same current which energizes the transmitter coil T also energizes the auxiliary coils $t_1$, $t_2$, $t_3$ and $t_4$.

The induction logging apparatus 13 also includes circuit means interconnecting the receiver coils R and $R_b$ for developing a signal dependent on the magnitude of the induced current flow in a portion of the surrounding surface material. This circuit means includes a phase selective circuit 22 and insulated conductor wires connecting a pair of input terminals thereof to the receiver coils R and $R_b$. The connection of these conductor wires in such that the receiver coils R and $R_b$ are connected in a series opposing manner. The relative numbers of turns on the receiver coils R and $R_b$ are such that there is substantially zero net inductive coupling or direct mutual coupling between the transmitter coil T and the receiver coils R and $R_b$ taken as a whole.

The locations of and the relative numbers of turns on the auxiliary coils $t_1$, $t_2$, $t_3$ and $t_4$ are such that, among other things, there is very little net mutual inductance between the set of auxiliary coils taken as a whole and the set of receiver coils R and $R_b$ taken as a whole.

There is supplied to a second pair of input terminals of the phase selective circuit 22 a phase reference signal produced by the voltage drop across the resistor 21. This phase reference signal is of the same phase as the current flowing in the transmitter coil T. The phase of the transmitter coil current will be used as the zero phase reference throughout the remainder of this description.

The phase selective circuit 22, under the control of the phase reference signal supplied thereto, serves to provide an output signal which is proportional to the magnitude of that component of the net receiver coil signal which is in phase (either zero degrees or 180 degrees) with the transmitter coil current. This output signal is supplied by way of insulated conductors in the cable 14 to a recorder 25 located at the surface of the earth. Within the recorder 25, these signals are recorded on a moving recording medium which is advanced in synchronium with the movement of the apparatus 13 through the borehole. This is accomplished by means of a measuring wheel 26 which engages the cable 14 and is rotated by movement thereof. Wheel 26 is coupled by a suitable mechanical linkage 27 to the film or chart paper advancing mechanism in the recorded 25.

Suitable electrical power for operating the downhole circuits is provided by a surface power supply unit 30 which is connected by way of insulated conductors within the cable 14 to a suitable power supply unit 31 contained in the downhole apparatus. Downhole power supply 31, in turn, supplies appropriate operating voltages to the signal generator 20 and the phase selective circuit 22.

Downhole units 20, 22 and 31 are physically located inside of the upper portion of the housing of the apparatus 13.

Considering the operation of the apparatus thus far described, the induction logging apparatus 13 is moved through the borehole 10 at a more or less uniform rate. At the same time, the signal generator 20 is operated to supply sinusoidal current to the transmitter coil T. The resulting alternating magnetic flux field radiating from the transmitter coil T induces current flow in the surrounding subsurface material. This current normally flows in circular loops which encircle and which are concentric with the longitudinal center axis of the coil support member 16. The more conductive the subsurface material, the greater is the magnitude of the induced current flow therein. Conversely, the smaller the conductivity, the smaller the magnitude of the induced current flow.

The induced current flowing in the subsurface material, in turn, induces voltages into the receiver coils R and $R_b$. The magnitudes of these voltages are directly dependent on the magnitude of the current flow in the subsurface material. The components of the receiver coil voltages which are of interest are those components which are in phase with the current in the transmitter coil T. The net in-phase component is proportional to the conductance component of the electrical impedance of the subsurface material.

Since the receiver coils R and $R_b$ are connected in a series opposing manner and since they are proportioned to provide zero mutual inductance with the transmitter coil T, the direct flux coupling between the transmitter and receiver coils produces very little (desirably "zero") net signal across the two series-connected receiver coils. Any residual net signal component produced because of such direct flux coupling will be in phase quadrature (either 90 degrees or 270 degrees) with the current in the transmitter coil T.

The net voltage signal developed across the receiver coils R and $R_b$ is applied to the phase selective circuit 22. Circuit 22 responds thereto to produce an output signal which is proportional to the magnitude of the net in-phase component of the receiver coil signal. In other words, the phase selective circuit 22 rejects or discriminates against any signal components of quadrature phase.

The resulting output signal from the phase selective circuit 22 is supplied by way of appropriate conductors in the cable 14 to the recorder 25 located at the surface of the earth. Recorder 25 operates to provide a continuous record or log of this signal as a function of the depth of the apparatus 13 in the borehole 10. The recorded signal values are directly proportional to the apparent electrical conductivity of the subsurface material which is within the investigating range of the downhole aparatus 13 at the times the signal values were obtained.

If desired, the recorder 25 may also include a reciprocal computer circuit for computing and recording a further signal proportional to the reciprocal of the original signal. This reciprocal signal is, thus, directly proportional to the apparent electrical resistivity of the subsurface material.

A feature of the present invention is the use of the reduced diameter auxiliary coils $t_1$, $t_2$, $t_3$ and $t_4$. These auxiliary coils are connected in series with the transmitter coil T and are energized by the same current that is flowing through the transmitter coil T. The auxiliary coils $t_1$, $t_2$, $t_3$ and $t_4$ function as transmitter coils of relatively weak strength for inducing additional current flow components in the adjacent subsurface material.

The various coils shown in FIG. 1 are indicated as having either positive (+) or negative (−) polarities. The two main coils T and R are arbitrarily assumed to be of positive polarity. Therefore, any other receiver coil that would contribute the same polarity of voltage as the voltage contributed by the receiver coil R in response to current flow caused by the transmitter coil T is deemed to be of positive polarity. Otherwise, it is deemed to be of negative polarity. Similarly, any other transmitter coil that would cause the receiver coil R to produce a voltage component of the same polarity as that produced by the transmitter coil T is deemed to be of positive polarity. Otherwise, it is deemed to be of negative polarity.

The first pair of auxiliary transmitter coils, $t_1$ and $t_2$, operate to induce an opposite polarity current flow component in the subsurface material in a limited region closely adjacent to the receiver coil $R_b$. This serves to cancel unwanted voltage components which would otherwise be induced in the receiver coil $R_b$ as a result of the normal current flow induced in this limited region by the transmitter coil T. In a similar manner, the second pair of auxiliary transmitter coils, $t_3$ and $t_4$, serve to induce an opposite polarity current flow component in the subsurface material located in a limited region closely adjacent to the receiver coil R. This opposite polarity current flow component serves to cancel undesired voltage components which would otherwise be induced in the receiver coil R.

Figure 2:
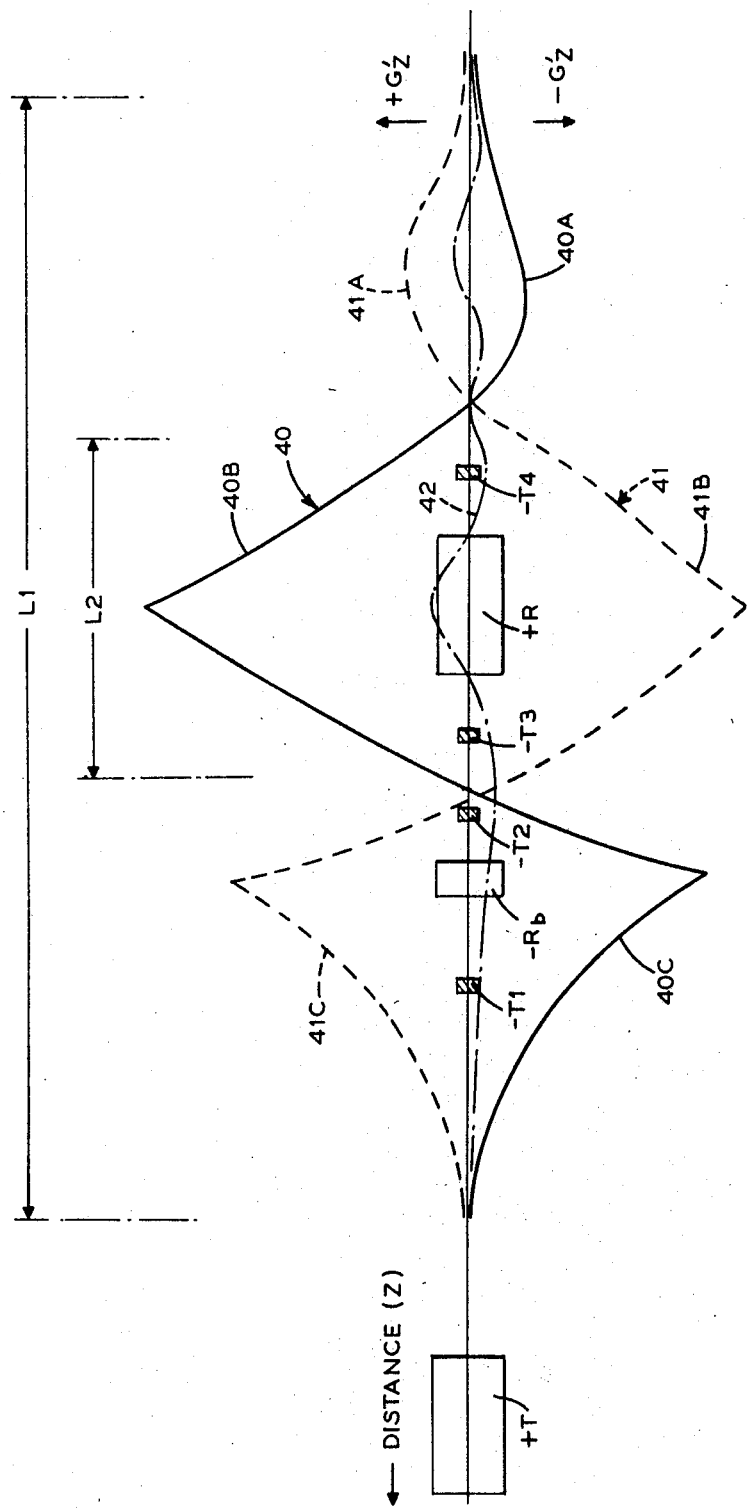
FIG. 2 is a graph showing the geometrical factor response of the FIG. 1 apparatus with respect to a selected portion of the region surrounding the apparatus.

To better understand how the auxiliary coils function to provide an improved coil system response, reference is had to FIGURE 2 of the drawings. FIG. 2 is a graph showing how the coil system is affected by different selected portions of the subsurface material adjacent thereto. The abscissa axis is plotted in terms of distance along the longitudinal (vertical) axis of the coil system. The ordinate axis is plotted in terms of a limited vertical geometrical factor value of $G_z'$.

The meaning of the limited vertical geometrical factor value $G_z'$ can be seen by referring to FIGURE 3, wherein element 50 represents the induction logging apparatus and element 51 represents the wall of the borehole. As is known, the response of an induction logging coil system to any given elemental ground loop portion of the surrounding subsurface material is proportional to the product of the conductivity C of the elemental portion and the geometrical factor g of the elemental portion. The geometrical factor depends exclusively on the geometry, that is, the dimension and position of the elemental portion with respect to the coil system. In the design of a coil system, the proportioning and location of the various coils determines the geometrical response pattern of the system.

The limited vertical geometrical factor $G_z'$ of present interest is the geometrical factor of a thin disc of subsurface material 53 which is coaxial wtih the longitudinal center axis of the coil system and which lies between radial distance $r_1$ and $r_2$, as measured from the center axis of the coil system. Radial distance $r_1$ corresponds to the radius of the borehole 51 and, for sake of an example, may be taken as being equal to four inches. (This is the nominal radius of the typical oil well borehole.) Radial distance $r_2$ corresponds to the radius of a cylindrical shell 52 and, for sake of an example, may be taken as being equal to eight inches. The vertical thickness of the disc 53 is taken as being equal to an elemental value $dz$. This disc 53 is assumed to have a conductivity of unity value. Also, it is assumed that all the remainder of the surrounding material has a conductivity of zero value, i.e., is not electrically conductive.

It is now desired to evaluate the response of the coil system as the elemental disc 53 is moved vertically past the coil system. This response is what is represented by the various curves depicted in FIG. 2. In particular, curve 40 represents the response, i.e., the output signal supplied to the recorder 25, as the elemental disc 53 is moved past the coil system for the case where the auxiliary coils $t_1$, $t_2$, $t_3$ and $t_4$ are not present and the primary transmitter coil T is connected directly to the conductor wires running to the signal generator 20. Curve 41 represents the additional response contributed by the addition of the auxiliary coils $t_1$, $t_2$, $t_3$ and $t_4$. Curve 42 represents the algebraic sum of curves 40 and 41 and thus represents the net response of the coil system with the auxiliary coils present.

By looking at the limited vertical geometrical factor curves of FIG. 2 it is possible to predict how the coil system will react to subsurface material lying within the cylindrical region between radii $r_1$ and $r_2$ (e.g., between four and eight inches). In the design of a coil system it is usually desired to make the coil system, as nearly as possible, completely insensitive to subsurface material lying in this four-to-eight inch region. For one thing, what is usually desired is to know the conductivity of the material located at a much greater radial distance from the borehole. For another thing, in practice the radius of the borehole is subject to considerable variation due to wobbling of the drilling bit, variations in the texture and composition of the different subsurface strata, etc. Since the conductivity of the drilling mud in the borehole is usually different from the conductivity of the adjoining earth formation, variations in borehole radius would introduce undesired variations into the coil system measurements if the system is responsive to the material in and close to the borehole.

Assuming for the moment that the auxiliary coils $t_1$, $t_2$, $t_3$ and $t_4$ are not present, then one manner of rendering the coil system insensitive to material lying in the four-to-eight inch region would be to locate and proportion the various coils so that the over-all net response to this four-to-eight inch region is negligible. This was, in fact, done for the coil system represented by the transmitted coil T and the receiver coils R and $R_b$. In particular, with reference to curve 40 of FIG. 2, these three coils were located and proportioned so that the sum of the various negative areas under the curve 40, namely, those at 40a and 40c, would have a value approximately equal to the positive area under the curve 40 as indicated at 40b.

It will be observed, however, that this is only a gross or over-all form of compensation. It will work and it will give the desired result only so long as the four-to-eight inch radial region adjacent the coil system is uniform over a longitudinal or vertical interval which is as long as or longer than the sensitive length of the coil system. This sensitive length is represented by the dimension $L_1$ in FIG. 2. This manner of compensation fails to provide complete compensation whenever there is present in the sensitive region of the coil system a shorter vertical interval having a different conductivity value than the remainder of the sensitive interval.

For example, assume that the borehole has a caved-in place at the location depicted by the dimension $L_2$ in FIG. 2. Further assume that this caved-in place extends out to the radial distance of eight inches. Also assume that the radius of the remainder of the borehole is at the four-inch value. Further assume that the drilling mud in the borehole is much more conductive than the adjacent earth formation. In such case, the highly conductive drilling mud located in the four-to-eight inch region at $L_2$ would give rise to a very large positive signal component across the two receiver coils (multiplication of the $G_z'$ values by the large conductivity value). This positive signal component would not be offset by the negative components introduced by the other portions of the four-to-eight inch radial region because these regions would be occupied by the less conductive earth formation material (multiplying the $G_z'$ values by a lower conductivity value).

The purpose of the auxiliary coils $t_1$, $t_2$, $t_3$ and $t_4$ is to provide a substantial improvement in this situation. In particular, the auxiliary coils $t_1$, $t_2$, $t_3$ and $t_4$ are proportioned and located so as to provide localized opposite polarity type responses in the intervals occupied by the receiver coils R and $R_b$. Roughly speaking, auxiliary coils $t_3$ and $t_4$ provide a negative response 41b in the vicinity of the receiver coil R which largely cancels the positive response 40b in this same region. Similarly, auxiliary coils $t_1$ and $t_2$ provide a positive response 41c in the vicinity of receiver coil $R_b$ which largely cancels the negative response 40c. The net response is indicated by curve 42.

It is noted that this added compensation is also not 100 percent complete, as is indicated by the net response curve 42. It is, however, a very substantial improvement and does render the coil system considerably less sensitive to localized borehole diameter variations of short extent. To the extent that the sum of the positive areas under the curve 42 cancels the sum of the negative areas under the curve 42, there is also provided the gross type of compensation previously considered.

In the representative embodiment shown in FIG. 1, the receiver coil $R_b$ is longitudinally spaced from the transmitter coil T such that the midpoints of these coils are separated by a distance of 48 inches. The midpoint of receiver coil R is spaced from the midpoint of receiver coil $R_b$ by a distance of 24 inches. The auxiliary coils $t_1$, $t_2$, $t_3$ and $t_4$ should be located relatively close to their corresponding ends of their corresponding receiver coils in order to have a minimum of effect with respect to subsurface material lying at a relatively large radial distance. For example, if it is desired that the auxiliary coils not have very much effect at radial distances larger than eight inches, then each auxiliary coil should not be spaced more than about eight inches from its end of its receiver coil. Thus, for example, the auxiliary coil $t_1$ should not be spaced more than about eight inches from the bottom end of receiver coil $R_b$. At the other extreme, none of the auxiliary coils should be spaced at a distance of less than about two inches from its end of its receiver coil. Otherwise, the positioning and proportioning of the auxiliary coil becomes very delicate and very sensitive with respect to its effect on the system.

In attempting to design a coil system to accomplish the foregoing "cave effect" compensation, it was found that auxiliary coils having "fractional" numbers of turns were required. Since such coils are practically impossible to construct, the situation was at first thought to be hopeless. The problem was solved, however, by recognizing that fractional turn coils could, in effect, be obtained if coils having diameters smaller than the diameters of the ordinary coils were used.

In comparing two different transmitter coils, for example, they can be said to have the same strength or effectiveness whenever the following condition prevails:

$$N_1 \cdot I_1 \cdot D_1^2 = N_2 \cdot I_2 \cdot D_2^2 \qquad (1)$$

where $N_1$ and $N_2$ denote the numbers of turns on the coils, $I_1$ and $I_2$ denote the currents flowing through the coils and $D_1$ and $D_2$ denote the diameters of the coils. In the present case, where the same current flows through all of the transmitter coils, the relationship of Equation 1 reduces to $$D_2/D_1 = \sqrt{N_1/N_2} \qquad (2)$$

Assume, for example, that the design calculations indicate that a particular compensating coil should have 0.06 turn $N_1$. Assume further that it is desired to replace such coil by a reduced diameter auxiliary coil having one complete turn $N_2$. Inserting these values into Equation 2, it is found that the reduced diameter coil should have a diameter $D_2$ which is 0.245 time the diameter $D_1$ of the ordinary type coil. Thus, the reduced diameter is approximately one-quarter of the ordinary coil diameter. By using such a reduced diameter, a one-turn auxiliary coil is made to have the same effect as a 0.06-turn ordinary type coil.

It may be seen from Equation 1 above that an auxiliary coil effectively having a fractional number of turns can also be obtained by varying the magnitude of the energizing current flowing through such auxiliary coil. Thus, if the energizing current through an auxiliary coil were made to be one-half the energizing current through the regular type transmitter coil T, then the actual number of turns for the auxiliary coil would be twice the effective number of turns. If this is applied to the above case where the diameter of the auxiliary coil has been reduced to one-quarter of the normal value, then two complete turns would be required on the auxiliary coil to make it have the same effect as a 0.06-turn conventional type coil. Thus, either a reduced diameter or a reduced current magnitude or both can be used to provide a fractional turn coil.

One way of reducing the current flow through the auxiliary coils is to connect these coils in parallel with the primary transmitter coil T, instead of in series therewith. The impedance in the parallel branch containing the auxiliary coils would be proportioned so that the energizing current through the auxiliary coils would be less than the energizing current through the primary transmitter coil T by the appropriate amount. In doing this, attention must be paid to the resulting phase angle of the energizing current flowing through the auxiliary coils. Preferably, this energizing current should be in phase with the energizing current flowing through the primary transmitter coil T. This, however, is not too critical if the set of auxiliary coils has been constucted so as to have a zero mutual inductance relationship with the set of receiver coils R and $R_b$. This is because in that case any quadrature component in the auxiliary coil energizing current would produce only quadrature components in the receiver coils, this being by way of current components induced in the subsurface material. Such quadrature components would be eliminated by the phase selective circuit 22.

It should also be understood that the theory of reciprocity applies to the present situation. For example, for the illustrated embodiment, the characteristics of the coil system would remain the same if the transmitter coils T, $t_1$, $t_2$, $t_3$ and $t_4$ are instead used as receiver coils and the receiver coils R and $R_b$ are instead used as transmitter coils. In other words, the coil functions can be interchanged and the system response will remain the same.

In the illustrated embodiment, the set of auxiliary coils was used to cancel the unndesired localized response peaks adjacent the receiver coils. The same technique can also be applied to systems where multiple transmitter coils are used in order to cancel undesired localized response peaks adjacent the transmitter coils. In this latter case, the auxiliary coils would be connected to function as additional receiver coils and would be positioned adjacent the transmitter coils. Such a case is represented by the illustrated embodiment if the operating functions of the two types of coils are interchanged.

Where multiple sets of both transmitter and receiver coils are used, two sets of auxiliary coils can be used, one set of auxiliary coils being constructed to cancel the undesired response peaks adjacent the receiver coils and the other set being used to cancel the undesired response peaks adjacent the transmitter coils.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In induction logging apparatus for investigating subsurface earth formations traversed by a borehole filled with a fluid material, the combination comprising:

a coil system adapted for movement through the borehole and including at least first coil means and second coil means longitudinally spaced from one another;

circuit means for causing one of the first and second coil means to function as transmitter coil means for inducing current flow in the surrounding subsurface material;

circuit means for causing the other of the first and second coil means to function as receiver coil means for developing a signal dependent on the magnitude of the induced current flow in a portion of the surrounding subsurface material;

a pair of auxiliary coil means supported adjacent the first coil means, one immediately above and the other immediately below the first coil means and each having an effective number of turns of less than unity relative to the first and second coil means;

and circuit means for causing the auxiliary coil means to function as the same type of coil means as the second coil means for producing a response from the subsurface material including the fluid material in a limited region near the first coil means which is of opposite polarity to and which at least in part offsets the response obtained from this region due to the transmitter coil.

2. In induction logging apparatus for investigating subsurface earth formations traversed by a borehole filled with a fluid material, the combination comprising:

a coil system adapted for movement through the borehole and including at least one transmitter coil and at least one receiver coil longitudinally spaced from one another;

circuit means for supplying an energizing current of predetermined magnitude to the transmitter coil for inducing current flow of a first polarity in the surrounding subsurface material;

circuit means coupled to the receiver coil for developing a signal dependent on the magnitude of the induced current flow in a portion of the surrounding subsurface material;

an auxiliary coil supported adjacent the receiver coil;

and circuit means for supplying to the auxiliary coil an energizing current having a magnitude which is substantially less than the predetermined magnitude for causing the auxiliary coil to function as an additional transmitter coil having an effective number of turns of less than unity for inducing in the subsurface material including the fluid material in a limited region near the receiver coil a current flow component of a polarity substantially opposite said first polarity which at least in part offsets the receiver coil signal component normally obtained from this region.

3. In induction logging apparatus for investigating subsurface earth formations traversed by a borehole filled with a fluid material, the combination comprising:

a coil system adapted for movement through the borehole and including at least one transmitter coil and at least two receiver coils longitudinally spaced from one another;

circuit means for energizing the transmitter coil for inducing current flow of a first polarity in the surrounding subsurface material;

circuit means coupled to the receiver coils for developing a signal dependent on the magnitude of the induced current flow in a portion of the surrounding subsurface material;

a first auxiliary coil supported adjacent a first one of the receiver coils and having an effective number of turns of less than unity relative to the transmitter and receiver coils;

a second auxiliary coil supported adjacent a second one of the receiver coils and having an effective number of turns of less than unity relative to the transmitter and receiver coils;

and circuit means connecting the first and second auxiliary coils in circuit with the transmitter coil for causing the auxiliary coils to function as additional transmitter coils, each auxiliary coil inducing in the subsurface material including the fluid material in a limited region near its receiver coil a current flow component of a polarity substantially opposite said first polarity which at least in part offsets the receiver coil signal component normally obtained from this region.

4. In induction logging apparatus for investigating subsurface earth formations traversed by a borehole filled with a fluid material, the combination comprising:

a coil system adapted for movement through the borehole and including at least two transmitter coils and at least one receiver coil longitudinally spaced from one another;

circuit means for energizing the transmitter coils for inducing current flow in the surrounding sursurface material;

circuit means coupled to the receiver coil for developing a primary signal dependent on the magnitude of the induced current flow in a portion of the surrounding subsurface material and of a first polarity;

a first auxiliary coil supported adjacent a first one of the transmitter coils and having an effective number of turns of less than unity relative to the transmitter and receiver coils;

a second auxiliary coil supported adjacent a second one of the transmitter coils and having an effective number of turns of less than unity relative to the transmitter and receiver coils;

and circuit means connecting the first and second auxiliary coils in circuit with the receiver coil for causing the auxiliary coils to function as additional receiver coils, each auxiliary coil responding to current flow in the subsurface material including the fluid material in a limited region near its transmitter coil for developing a signal of a polarity substantially opposite from said first polarity which is combined with the primary receiver coil signal and which at least in part offsets the receiver coil signal component normally obtained from this limited region.

5. In induction logging apparatus for investigating subsurface earth formations traversed by a borehole filled with a fluid material, the combination comprising:

elongated support means adapted for movement through the borehole;

at least one transmitter coil and at least two receiver coils supported on the support means coaxial with the longitudinal axis thereof and longitudinally spaced apart from one another;

circuit means for energizing the transmitter coil for inducing current flow of a first polarity in the surrounding subsurface material;

circuit means coupled to the receiver coils for developing a signal dependent on the magnitude of the induced current flow in a portion of the surrounding subsurface material;

a first pair of auxiliary coils supported on the support means, one immediately above and the other immediately below a first one of the receiver coils, each of these auxiliary coils having an effective number of turns of less than unity relative to the transmitter and receiver coils;

a second pair of auxiliary coils supported on the support means, one immediately above and the other immediately below a second one of the receiver coils, each of these auxiliary coils having an effective number of turns of less than unity relative to the transmitter and receiver coils;

and circuit means connecting the various auxiliary coils in circuit with the transmitter coil for causing the auxiliary coils to function as additional transmitter coils, each pair of auxiliary coils inducing in the subsurface material including the fluid material in a limited region near its receiver coil a current flow component of a polarity substantially opposite said first polarity which at least in part offsets the receiver coil signal component normally obtained from this region.

6. In induction logging apparatus for investigating subsurface earth formations traversed by a borehole filled with a fluid material, the combination comprising:

elongated support means adapted for movement through the borehole;

at least one transmitter coil and at least two receiver coils supported on the support means coaxial with the longitudinal axis thereof and longitudinally spaced apart from one another, each of these coils being of a common predetermined diameter;

circuit means for energizing the transmitter coil for inducing current flow of a first polarity in the surrounding subsurface material;

circuit means coupled to the receiver coils for developing a signal dependent on the magnitude of the induced current flow in a portion of the surrounding subsurface material;

a first pair of auxiliary coils supported on the support means, one immediately above and the other immediately below a first one of the receiver coils, each of these auxiliary coils having a diameter which is substantially less than the predetermined diameter for providing an effective number of turns of less than unity relative to the transmitter and receiver coils;

a second pair of auxiliary coils supported on the support means, one immediately above and the other immediately below a second one of the receiver coils, each of these auxiliary coils having a diameter which is substantially less than the predetermined diameter for providing an effective number of turns of less than unity relative to the transmitter and receiver coils;

and circuit means connecting the various auxiliary coils in circuit with the transmitter coil for causing the auxiliary coils to function as additional transmitter coils, each pair of auxiliary coils inducing in the subsurface material including the fluid material in a limited region near its receiver coil a current flow component of a polarity substantially opposite said first polarity which at least in part offsets the receiver coil signal component normally obtained from this region.

7. In induction logging apparatus for investigating subsurface earth formations traversed by a borehole filled with a fluid material, the combination comprising:

a coil system adapted for movement through the borehole and including at least one transmitter coil and at least one receiver coil longitudinally spaced from one another;

circuit means for supplying an energizing current of predetermined magnitude to the transmitter coil for inducing current flow of a first polarity in the surrounding subsurface material;

circuit means coupled to the receiver coil for developing a signal dependent on the magnitude of the induced current flow in a portion of the surrounding subsurface material;

a pair of auxiliary coils supported adjacent the receiver coil, one immediately above and one immediately below the receiver coil;

and circuit means for supplying each of the auxiliary coils an energizing current having a magnitude which is substantially less than the predetermined magnitude for causing the auxiliary coils to function as an additional transmitter coil each having an effective number of turns of less than unity for inducing in the subsurface material including the fluid material in a limited region near the receiver coil a current flow component of a polarity substantially opposite said first polarity which at least in part offsets the receiver coil signal component normally obtained from this region.

References Cited

UNITED STATES PATENTS

| | | | |
|---|---|---|---|
| 3,051,892 | 8/1962 | Huston | 324—6 |
| 3,065,407 | 11/1962 | Huddleston et al. | 324—6 |
| 3,181,057 | 4/1965 | Bravenec | 324—6 XR |
| 2,451,596 | 10/1948 | Wheeler | 324—3 |
| 2,582,314 | 1/1952 | Doll | 324—6 |
| 3,015,060 | 12/1961 | McLaughlin et al. | 324—6 XR |
| 3,105,190 | 9/1963 | Norris | 324—6 |
| 3,108,220 | 10/1963 | Ruddock | 324—6 |
| 3,259,836 | 7/1966 | Oshry | 324—6 |
| 3,327,203 | 6/1967 | Attali | 324—6 |

GERARD R. STRECKER, Primary Examiner